(12) United States Patent
Kumagai et al.

(10) Patent No.: US 8,150,243 B2
(45) Date of Patent: Apr. 3, 2012

(54) HEATING PROCESS APPARATUS

(75) Inventors: Akira Kumagai, Tama (JP); Masami Shibagaki, Fuchu (JP); Kenji Numajiri, Chofu (JP); Akihiro Egami, Kawasaki (JP)

(73) Assignee: Canon Anelva Corporation, Kawasaki-shi (JP)

( * ) Notice: Subject to any disclaimer, the term of this patent is extended or adjusted under 35 U.S.C. 154(b) by 330 days.

(21) Appl. No.: 12/613,288

(22) Filed: Nov. 5, 2009

(65) Prior Publication Data

US 2010/0111512 A1  May 6, 2010

Related U.S. Application Data

(63) Continuation of application No. PCT/JP2007/060021, filed on May 16, 2007.

(51) Int. Cl.
*A21B 2/00* (2006.01)
(52) U.S. Cl. ....................................... 392/416
(58) Field of Classification Search .......... 392/407–440; 219/405
See application file for complete search history.

(56) References Cited

U.S. PATENT DOCUMENTS

| | | | |
|---|---|---|---|
| 5,444,217 A | 8/1995 | Moore et al. | 219/405 |
| 5,580,388 A | 12/1996 | Moore | 118/728 |
| 5,683,518 A | 11/1997 | Moore et al. | 118/730 |
| 5,710,407 A | 1/1998 | Moore et al. | 219/405 |
| 5,820,686 A | 10/1998 | Moore | 118/730 |
| 6,151,447 A | 11/2000 | Moore et al. | 392/418 |
| 6,190,037 B1 | 2/2001 | Das et al. | 374/121 |
| 6,310,327 B1 | 10/2001 | Moore et al. | 219/405 |
| 2008/0213988 A1 | 9/2008 | Shibagaki et al. | |
| 2009/0190908 A1 | 7/2009 | Shibagaki | |

FOREIGN PATENT DOCUMENTS

| | | |
|---|---|---|
| JP | 9-129714 | 5/1997 |
| JP | 10-104084 | 4/1998 |
| JP | 11-035334 | 2/1999 |
| JP | 2000-036370 | 2/2000 |
| JP | 2001-021416 | 1/2001 |
| JP | 2001-081569 | 3/2001 |
| JP | 2004-193238 | 7/2004 |
| WO | WO 2006/043530 | 4/2006 |

OTHER PUBLICATIONS

"Performance in Use of MES Interface Function", [online], Mitsubishi Graphic Operation Terminal Technical News, No. GOT-D-0012, May 31, 2006 [Search Date: Jun. 1, 2007], Internet <URL:http://wwwf2.mitsubishielectric.co.jp/got/technews/gotd0012/gotd0012.pdf>.
International Search Report and Written Opinion and dated Jun. 19, 2007, and International Preliminary Examination Report dated Jun. 16, 2007 in related corresponding PCT Japanese Patent Appln. No. PCT/JP2007/060021.

*Primary Examiner* — Daniel L Robinson
(74) *Attorney, Agent, or Firm* — Fitzpatrick, Cella, Harper & Scinto

(57) ABSTRACT

A heating process apparatus includes a process chamber, a heat-processed object support member provided in the process chamber for heating a substrate disposed thereon, a cap for covering the substrate disposed on the heat-processed object support member, a heater for heating the heat-processed object support member, a temperature measuring unit for measuring the temperature of the heat-processed object support member, and a controller for controlling the heater. A first measuring unit measures a temperature of the cap, and the controller controls the heater so as to set the cap temperature to a predetermined temperature. A second measuring unit measures a temperature of the heat-processed object support member, and the controller turns off the heater when the temperature of the heat-processed object support member exceeds an over-heat critical temperature.

14 Claims, 7 Drawing Sheets

HEATING PROCESS APPARATUS

CROSS-REFERENCES TO RELATED APPLICATIONS

This application is a continuation application of International Application No. PCT/JP2007/060021, filed on May 16, 2007, the entire contents of which are incorporated by reference herein.

TECHNICAL FIELD

The present invention relates to a heating process apparatus.

BACKGROUND ART

FIG. 1 is a cross-sectional view of a conventional heating process apparatus 10. A heating process chamber 11 is a chamber made of water-cooled aluminum with a reflectance improved by mirror finishing of its inner wall and has a fluid flowing section 19 in which a cooling fluid can flow. The heating process chamber 11 can be evacuated to a vacuum of approximately $10^{-2}$ Pa. However, a heating process can also be performed at atmospheric pressure.

A heater 13 including a filament and a filament power supply is contained inside a heat-processed object support member (susceptor) 12 coated with a coating layer A of pyrolytic carbon. A substrate 14 to be subjected to heating process is placed on the heat-processed object support member 12 on the upper side in FIG. 1. A thermo coupler 15, 16 is disposed on the heat-processed object support member 12 with the substrate 14 placed on its upper side, thereby allowing heating temperature to be sensed. The substrate 14 is heated by applying a predetermined voltage to the filament by the filament power supply to accelerate thermoelectrons generated from the filament to bombard them onto the heat-processed object support member 12 to generate heat. The heater 13 may be a thermoelectron generator for electron bombardment heating or an infrared lamp for infrared lamp heating.

The interior of the heat-processed object support member 12 can be evacuated by a vacuum pump system different from that for the heating process chamber 11 constantly to a vacuum of approximately $10^{-2}$ Pa or less. For controlling the temperature in the heating process apparatus 10, the thermo coupler 16 of tungsten-rhenium (W—Re) is inserted through a port 18 in a side of the heating process chamber 11 into a groove in a side of the heat-processed object support member 12 to measure and control the heat-processed object support member 12 (Patent document 1).

Patent document 1: Japanese Patent Application Laid-Open No. 2000-36370

However, the conventional heating process apparatus 10, which uses the thermo coupler 16 to control the temperature of the heat-processed object support member 12, has problems that the thermo coupler 16 does not make direct contact measurement since the thermo coupler 16 is simply inserted in the groove in the side surface of the heat-processed object support member 12 and that the temperature of the cap 17 and the temperature of the substrate 14 cannot be correlated to each other since the temperature of a location on the side surface of the heat-processed object support member 12 has a steep temperature gradient. In addition, the tungsten-rhenium (W-Re) thermo coupler 16 used in the conventional heating process apparatus 10 deteriorates and breaks so that it becomes unable to accomplish temperature control at high temperatures higher than or equal to 1850 degrees, and therefore cannot cover the temperature range (1550 to 2400 degrees) required in the heating process by the apparatus. Therefore, an object of the present invention is to solve these problems and provide a heating process apparatus consistently capable of controlling to a constant temperature and controlling in a high-temperature range higher than or equal to 1850 degrees.

SUMMARY OF THE INVENTION

To achieve the object, a first aspect of the present invention provides a heating process apparatus including: a process chamber; a heat-processed object support member provided in the process chamber; a heater provided inside the heat-processed object support member; and temperature measuring means for measuring the temperature of the heat-processed object support member; wherein the temperature measuring means is provided outside a transmissive window provided in a peripheral wall of the process chamber and through which infrared energy radiated from the heat-processed object support member can be transmitted; and the temperature measuring means comprises a collector collecting infrared energy radiated from the heat-processed object support member and a calculating unit calculating temperature based on the ratio between the intensities of two wavelengths in the infrared.

The use of the temperature measuring means for observation and control of the temperature of the heat-processed object support member enables noncontact direct temperature measurement and observation of the temperature of a location where there is not a temperature gradient. Therefore, constant temperature control can be consistently accomplished. In addition, temperature control in a high-temperature range higher than 1850 degrees, which is the biggest issue, can be accomplished.

A heating process apparatus 20 according to the present invention measures temperature based on the ratio between intensities of two wavelengths in an infrared radiation region. Therefore, the temperature of the cap 25 or the heat-processed object support member 22 can be directly measured in a noncontact manner under constantly stable conditions without being affected by the conditions of the surface of the heat-processed object support member 22 and the heat receiving element (cap) 25 and the temperature of a substrate 26 can be accurately estimated. In addition, the use of the temperature measuring means 24 enables reliable measurement of temperatures in a high-temperature range higher than 1850 degrees (for example, 2400 degrees), in which temperature control was unable to be accomplished with a tungsten-rhenium (W—Re) thermo couple.

Furthermore, the use of the heating process apparatus 20 according to the present invention can prevent displacement of a substrate 26 which would otherwise occur during evacuation of the heating process chamber 21, to enable measurement of emitted light under constant conditions, thereby high reliability can be achieved.

Moreover, by using the heating process apparatus 20 according to the present invention 20, the heat capacity can be kept constant independently of the size of each individual substrate 26 and therefore the temperature of the substrates can be reproducively controlled with respect to heating power. In addition, temperature variations depending on substrate size corresponding to one set temperature are eliminated and substrate temperature check is enabled. Because the heat capacity is kept constant, variations in emission current value are eliminated and a reproducible start of temperature rise can be achieved in the temperature rising process.

LIST OF REFERENCE NUMERALS

Figure 1:
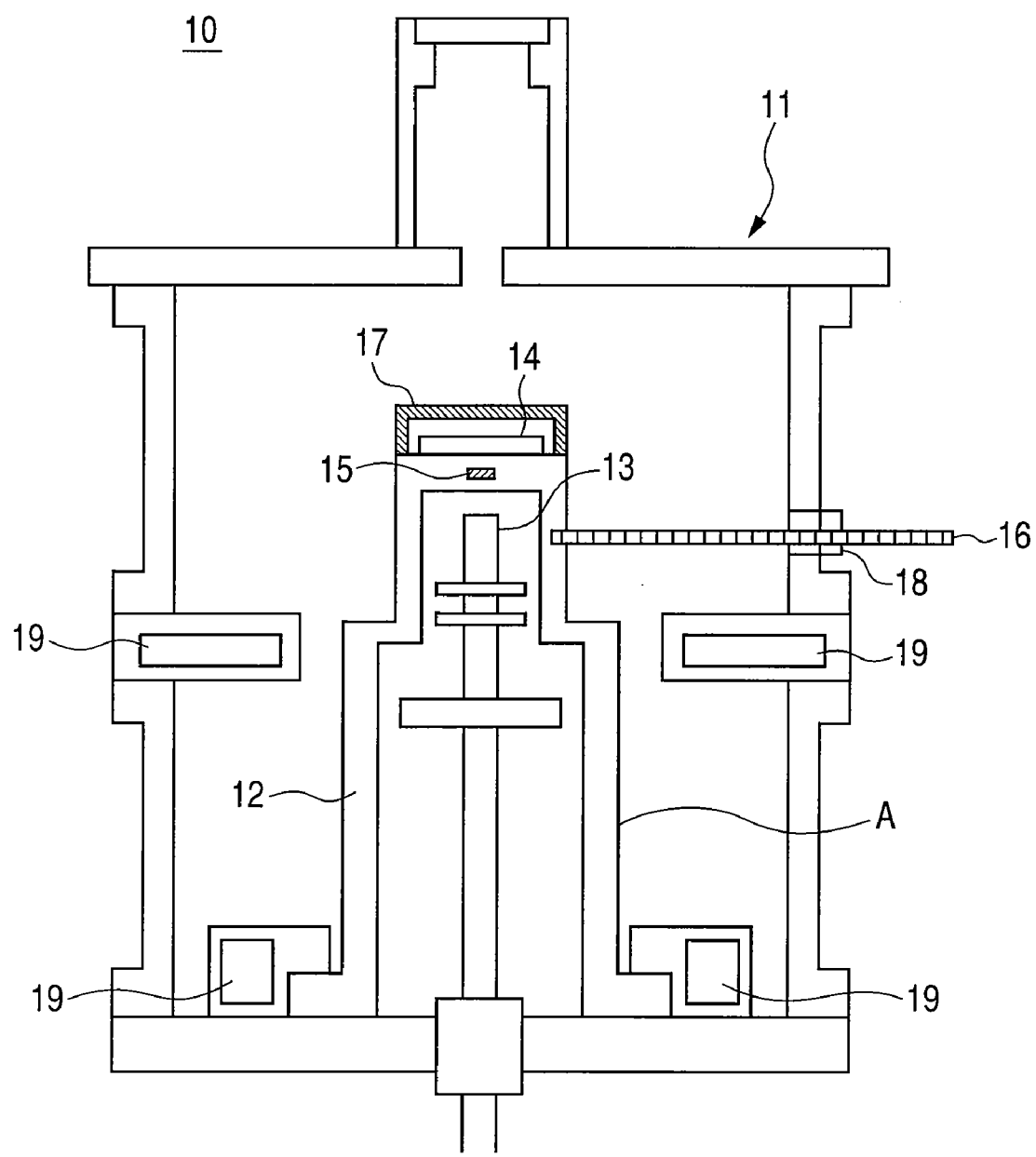
FIG. 1 is a cross-sectional view of a conventional heating process apparatus.

10 Heating process apparatus
11 Heating process chamber
12 Heat-processed object support member
13 Heater
14 Substrate
15, 16 Thermo coupler
17 Cap
18 Port
19 Fluid flowing section
20 Heating process apparatus
21 Heating process chamber
22 Heat-processed object support member
23a Filament
23b Filament power supply
24 Temperature measuring means
25 Cap
26 Substrate
27 Transmissive window
28 Controller
28a Thermostatic controller
28b Sequencer
28c GOT
30 Temperature measuring means
31 Collector
32 Fiberglass
33 Si temperature element
34 InGaAs temperature element
35 Arithmetic circuit
36 Calculating unit
50 Heating process apparatus
51 Burn injury preventing means
51a Sequencer
51b GOT
52 Temperature measuring means
53 Vent means
70 Heating process apparatus
71 Heating process chamber
72 Heat-processed object support member
73 Cap
74 Substrate
75 Heater
76 Resting area
77 Intermediate flange
80 Heating process apparatus
81 Heating process chamber
82 Heat-processed object support member
83 Cap
84 Substrate
85 Heater
86 Substrate transfer tray
87 Intermediate flange
90 Heating process apparatus
91 Heating process chamber
92 Heat-processed object support member
93 Cap
94 Substrate
95 Heater
96 Enclosure plate
97 Intermediate flange

DESCRIPTION OF EMBODIMENTS

Figure 2:
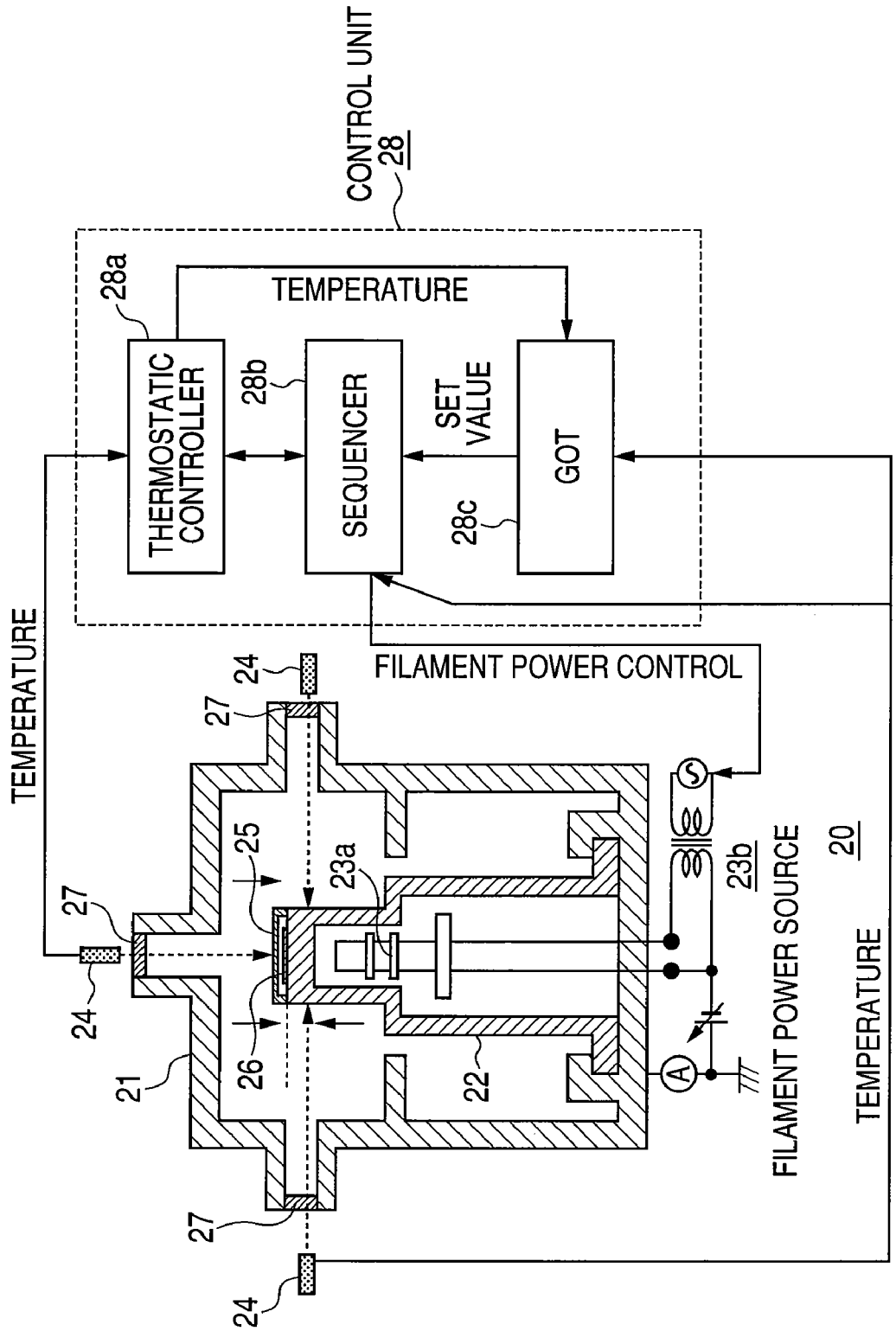
FIG. 2 is a cross-sectional view of a heating process apparatus of the present invention.

A first exemplary embodiment of the present invention will be described with reference to FIGS. 2 to 6. FIG. 2 schematically shows a heating process apparatus. A heat-processed object support member 22 is placed in an evacuatable heating process chamber 21 (vacuum vessel). The interior of the heat-processed object support member 22 is also structured to be evacuatable. A heater 23 which includes a filament 23a capable of heating the upper portion of the heat-processed object support member 22 and a filament power supply 23b is contained within the heat-processed object support member 22. In the present embodiment, a temperature measuring means 24 capable of measuring the temperatures of the upper and side surfaces of the heat-processed object support member 22 is provided on the outer side of the peripheral wall of the heating process chamber 21 so that the temperatures of a cap 25 and the heat-processed object support member 22 can be measured at the same time. The temperature measuring means 24 is used to directly measure the temperatures of the cap 25 and the heat-processed object support member 22 in a noncontact manner, thereby enabling temperature control to a high-temperature range higher than or equal to 1850 degrees. In order to increase the accuracy of temperature measurement, a transmissive hole through which radiation energy from the heat-processed object support member 22 can be transmitted can be provided in the cap 25.

The heater 23 includes the filament 23a and filament power supply 23b. A substrate 26 is heated by applying a predetermined voltage to the filament 23a from the filament power supply 23b to accelerate thermoelectrons generated at the filament 23a to bombard the heat-processed object support member 22 to generate heat. A transmissive window 27 through which radiation energy from the heat-processed object support member 22 can be transmitted is provided in the peripheral wall of the heating process chamber 21. Temperature measuring means 24 (pyrometer or radiation thermometer) including a collector which collects infrared energy radiated from the heat-processed object support member 22 through the transmissive window 27 and a calculating unit which calculates temperature based on the ratio between intensities of two wavelengths in the infrared is provided outside the heating process chamber 21.

Figure 3:
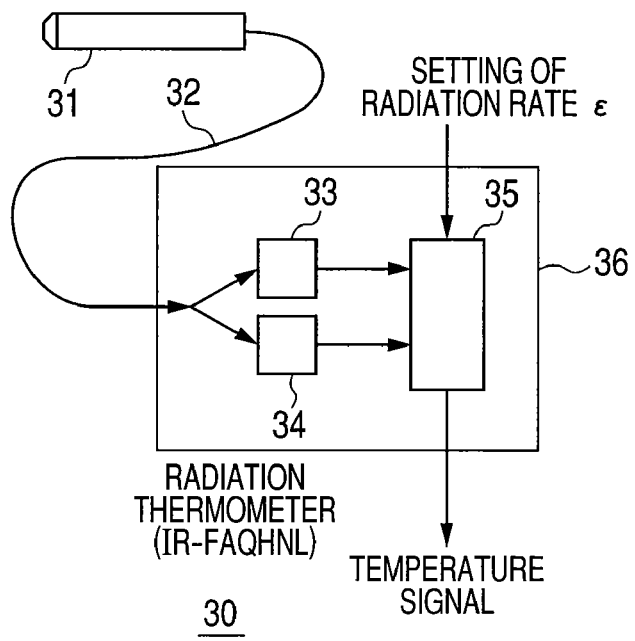
FIG. 3 is a structural drawing of a dual-wavelength radiation thermometer of the present invention.

FIG. 3 is a schematic diagram of temperature measuring means 30 (pyrometer) which includes a collector 31 and a calculating unit 36 and is capable of dual-wavelength (two-color) measurement. A structure and operation principle of the pyrometer, which is the temperature measuring means 30 used in the present invention, will be described below.

A window material in the bulkhead between the exterior and a vacuum is made of quartz glass. The temperature of the heat-processed object support member 22 in the vacuum is measured through the window. In order to measure the temperature of the heat-processed object support member 22 in the high-temperature range from 800 to 2300° C., two color measuring wavelengths of 1.55 μm and 0.9 μm are used.

Infrared light collected by a collector 31 (IR-FL2) is transmitted to a calculating unit 36 (IR-FAQHNL) through a fiberglass 32.

The light transmitted to the calculating unit 36 is provided to a temperature element 33 made of Si and another temperature element 34 made of InGaAs (two-color system). The InGaAs element 34 converts the intensity of a peak wavelength of 1.55 μm to a voltage and the Si temperature element 33 converts the intensity of a peak wavelength of 0.9 μm to a voltage.

An arithmetic circuit 35 calculates temperature based on a preset emissivity $\epsilon$ (set to 0.9 in this experiment) and the ratio between the intensities of the two wavelengths and outputs a temperature signal to the outside.

The two-color system (in which two wavelengths are detected) can accurately and reliably monitor temperature regardless of the surface conditions of an object under measurement (here the heat-processed object support member 22 or the cap 25) as compared with a system in which the intensity of transmitted infrared radiation is directly converted to temperature. The surface of the heat-processed object support member 22 or cap 25, which is made of high-purity carbon or high-purity carbon coated with pyrolytic carbon, can become rough or the coating can fall off or contamination from a substrate 26 can deposit on the heat-processed object support member 22 or cap 25 due to repeated use in a long period of time. If a short-wavelength radiation thermometer (for example IR-CAS from Chino Corporation) as the temperature measuring means 24, changes in emissivity $\epsilon$ directly affect temperature and accordingly a temperature reading can differ from an actual temperature. Therefore, the substrate 26 can be heated to a temperature different from a desired temperature and reproducibility cannot be achieved. On the other hand, if the dual-wavelength radiation thermometer is used as the temperature measuring means 24, actual temperature can be indicated and reproductive heating of substrates can be achieved even when the emissivity E of the surface changes with long-term use, because temperature is determined by calculating the ratio between the intensities of a long wavelength (for example 1.55 μm) and a short wavelength (for example 0.9 μm) of infrared radiation.

If the short-wavelength radiation thermometer is used to measure temperatures in a high-temperature range, the temperature of an area including not only the heat-processed object support member or the cap 25 but also other area (for example the wall of the heating process chamber 21) would be measured because the lens aperture is as large as $\phi$ 20 mm. Therefore, it is difficult to measure the temperature of the desired location. On the other hand, in the dual-wavelength radiation thermometer, the measurement aperture can be reduced to approximately $\phi$ 2 mm to $\phi$ 5 mm. Therefore the temperature of a desired location of the heat-processed object support member 22 or cap 25 can be measured.

As shown in FIG. 2, a controller 28 is connected to the temperature measuring means 24 provided in an upper surface and side surface of the heating process chamber 21. The controller 28 controls the temperature of the heat-processed object support member 22 so as to be in the range from 800 to 2300 degrees. When the temperature of the heat-processed object support member 22 reaches 2300 degrees or higher, the controller 28 turns off the filament power supply 23b.

The controller 28 includes a thermostatic controller 28a in which a measured temperature of the heat-processed object support member 22 is input from the temperature measuring means 24, a sequencer 28b which compares the measured temperature value input from the thermostatic controller 28a with a set temperature value to control an electric power value provided to the filament power supply 23b, and a GOT (Graphic Operation Terminal) 28c which displays the temperature of the surface of an object under measurement.

A temperature control method using the temperature measuring means 24 will be described below. First, a set temperature value and a maximum emission current value are input in the sequencer 28b beforehand. Second, the temperature of the heat-processed object support member 22 or the cap 25 put on the heat-processed object support member 22 is measured with high-temperature measuring means 24 for control (provided on the top surface of the heating process chamber 21). Third, the measured temperature value input in the thermostatic controller 28a is compared with the set value input in the sequencer 28b, and an electric power value provided to the filament power supply 23b is feedback-controlled and the heater temperature is controlled by the sequencer 28b so as to control the emission current value while on the other hand the temperature is displayed on the GOT (Graphic Operation Terminal) 28c. Fourth, in order to prevent overheat temperature, a temperature signal from monitoring high-temperature measuring means 24 which measures the temperature of the side surface of the heat-processed object support member 22 is input in the sequencer 28b to monitor that the temperature is less than or equal to a critical overheat temperature of 2300° C. In the event that the temperature exceeds the set value, the filament power supply 23b is automatically turned off in order to protect the heater. The temperature indicated by the temperature signal from the monitoring high-temperature measuring means 24 is also displayed on the GOT (Graphic Operation Terminal) 28c.

In addition to the temperature control of the heating process apparatus 20 shown in FIG. 2, minimization of damage to the heating process apparatus 20 due to poor connection of the temperature measuring means 24 of the heating process apparatus 20 can be ensured according to the present invention. Examples of poor connection of the temperature measuring means 24 here include poor connection between the fiberglass 32 and the calculating unit 36 in FIG. 3. If there is such poor connection of the temperature measuring means 24, temperature control of the heating process apparatus 20 becomes impossible and overheating can severely damage the heating process apparatus 20. Such a situation will be described more specifically below.

Figure 4:
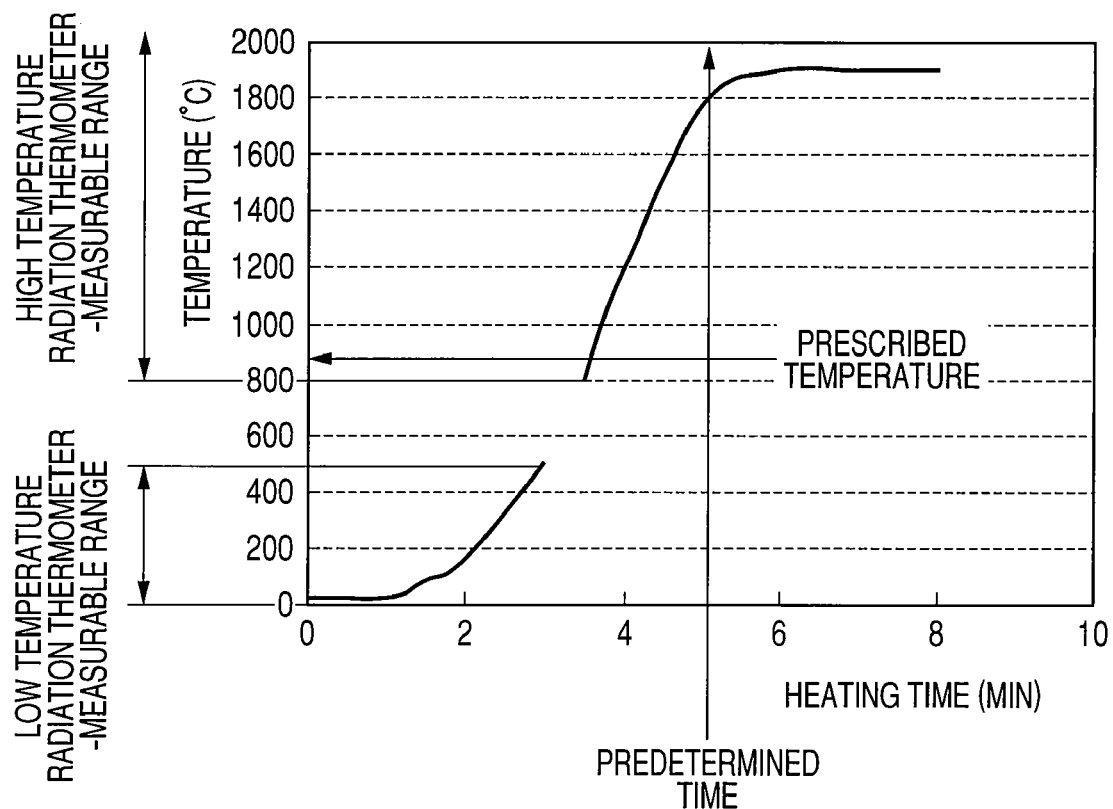
FIG. 4 is a diagram illustrating variations in measured temperature versus heating time of the heating process apparatus of the present invention.

If the fiberglass 32 is removed for maintenance or other reasons and then the heating process apparatus 20 is used without connecting the fiberglass 32 to the calculating unit 36 and the power supply for the temperature measuring means 24 is normal, a temperature signal of a room temperature level is input from the temperature measuring means 24 into the thermostatic controller 28a of the controller 28 and the abnormal condition will not be found. If the connection were proper, a temperature reading of 900° C. or higher would be provided as shown in FIG. 4 in about three and a half minutes after heating is started at an emission voltage of 2.8 kV, a maximum emission current value of 6.5 A, and a set temperature of 1900° C. FIG. 4 shows change in measured temperature (° C.) of a location under measurement with respect to heating time (in minutes) in an implementation of the heating process apparatus 20 according to the present invention. In the present example, the specified temperature is set to 900° C. and error control based on the specified temperature is performed as described below.

In a situation where the fiberglass 32 is not properly connected to the calculating unit 36, a temperature signal output from the temperature measuring means 24 keeps representing a temperature lower than 800° C. even when the filament 23a is heated by the output from the filament power supply 23b to heat the heat-processed object support member 22. Under such a condition, the temperature of the heating process apparatus 20 cannot be controlled and the apparatus 20 can be seriously damaged due to overheating.

Therefore, in the present example, if the temperature signal from the temperature measuring means 24 does not indicate a temperature equal to or higher than a specified temperature of 900° C. after a lapse of 8 minutes, it is considered that the fiberglass 32 is not properly connected to the calculating unit 36, and the output from the filament power supply 23D is turned off and an error indication is displayed on the GOT 28c. This can prevent overheating to a high temperature and minimize damage to the apparatus 20. The error indication is displayed on the GOT 28c through the sequencer 28b which has received the temperature signal input from the temperature measuring means 24.

According to the present invention, damage to the heating process apparatus 20 due to a failure of the temperature measuring means 24 of the heating process apparatus 20 shown in FIG. 2 can also be minimized. Examples of failure of the temperature measuring means 24 here include a break of the power cable of the temperature measuring means 24. Such a failure can be caused by repeated closing and opening of the lid to which the temperature measuring means 24 is attached for maintenance and placing in and taking out substrates 26. In case of such a failure of the temperature measuring means 24, the temperature control of the heating process apparatus 20 becomes impossible and the apparatus 20 can be seriously damaged due to overheating.

Therefore, in another example, if a temperature signal from the temperature measuring means 24 is not detected at the controller 28, the filament power supply 23b is turned off through the sequencer 28b and an error indication is displayed on the GOT 28c in order to prevent overheating to a temperature exceeding an allowable range, thereby minimizing damage to the heating process apparatus 20. If the signal line interconnecting the temperature measuring means 24 and the controller 28 breaks, an electrical signal indicating temperature is not input in the controller 28 and control of the temperature of the heater 23 becomes impossible. In case of such a failure, the heating process apparatus 20 can be seriously damaged if heating is continued. Therefore, if the electrical signal from the temperature measuring means 24 cannot be detected at the controller 28, the filament power supply 23b is turned off and an error indication is displayed on the GOT 28c.

According to the present invention, damage to the heating process apparatus 20 due to a functional failure of the heater 23 of the heating process apparatus 20 shown in FIG. 2 can also be minimized. Functional failures of the heater 23 here include poor proportional-integral-derivative (PID) control by the heater 23 for controlling heating temperature due to some problem. The heater 23 controls the heating temperature by the PID control, which can fail to function due to some problem. If heating is continued under such a condition, the heating process apparatus can be seriously damaged. Therefore, in yet another example, the filament power supply 23b is turned off through the sequencer 28b and an error indication is displayed on the GOT 28c if a temperature signal input from the temperature measuring means 24 indicates a temperature exceeding 2100° C. and such temperature signal continues to be detected for a period of time longer than three seconds.

Figure 5:
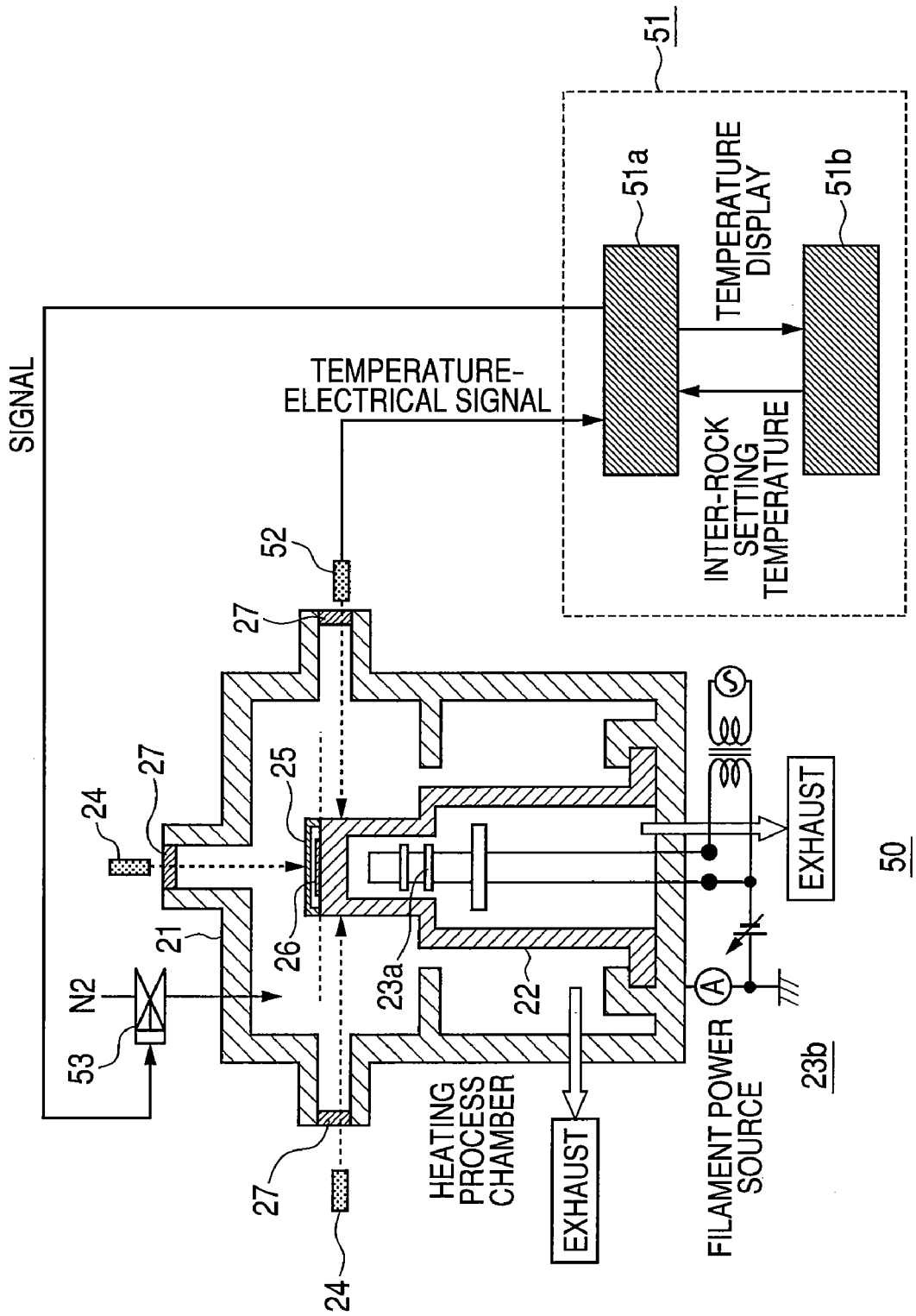
FIG. 5 is a diagram illustrating burn injury preventing means of the present invention.

FIG. 5 is a diagram illustrating burn injury preventing means 51. The heating process apparatus 50 shown in FIG. 5 has the same configuration as that of the heating process apparatus 20 shown in FIG. 2 and detailed description of the configuration which will be omitted. Burn injury preventing means 51 which detects a burn injury hazard and inputs a signal in vent means 53 connected to the heating process chamber 21 depending on the detection is connected to temperature measuring means 52 provided on the side surface of the heating process chamber 21. The burn injury preventing means 51 includes a sequencer 51a which compares the value of measured temperature detected by the temperature measuring means 52 with a set temperature value and inputs a signal based on the result of the comparison to the vent means 53 connected to the heating process chamber 21 and a GOT (Graphic Operation Terminal) 51b which displays a measured temperature value.

The temperature measuring means 52 is a pyrometer capable of measuring temperatures in the range from 0 to 500 degrees. A mechanism of the pyrometer will be described first. The burn injury prevention interlock pyrometer used here is FT-30 from Keyence Corporation which is capable of measuring temperatures in the range from 0 to 500° C. with detected wavelengths in the range from 8 to 14 μm. A thermopile in which thermo couples are arranged reticularly under an infrared absorbing film is used as the temperature sensor of the pyrometer to improve the response.

The burn injury preventing means 51 will be described below. In order to measure temperatures in a low-temperature range lower than or equal to 500° C. in a noncontact manner, infrared radiation in the long-wavelength range from 8 to 14 μm is detected. Accordingly, the window material of a bulk-head viewing port between the exterior and a vacuum is made of CaF2. Infrared radiation detected by the low-temperature pyrometer 52 (provided on the side surface of the heating process chamber 21) is converted to an electrical signal representing temperature and is input in the sequencer 51a. The sequencer 51a compares it with a preset interlock temperature to detect whether a burn injury hazard is present. Only if the measured temperature is lower than the preset temperature, the heating process chamber 21 is vented. The temperature reading of the low-temperature pyrometer is constantly displayed on the screen of the GOT (Graphic Operation Terminal) 51b.

Figure 6:
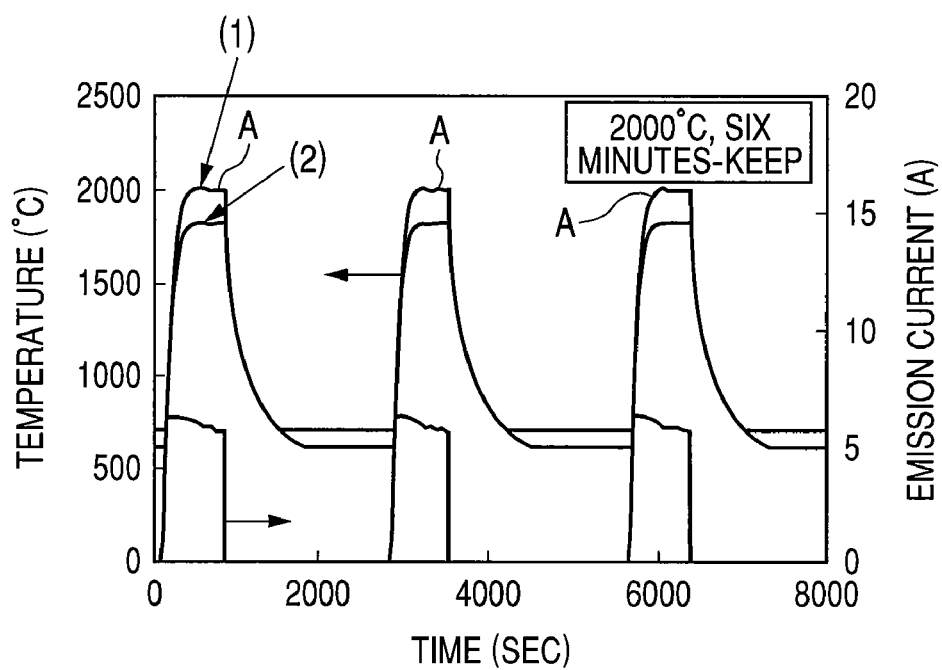
FIG. 6 is a diagram showing temperatures measured by an upper radiation thermometer of the present invention.

FIG. 6 shows change in measured temperature (° C.) of the heat-processed object support member 22 or the cap 25 of an implementation of a heating process apparatus 20 according to the present invention with time (seconds). Curve (1) represents temperature measured with upper temperature measuring means 24. The temperature measured is the temperature of the cap 25 because a substrate 26 placed on the heat-processed object support member 22 is covered with the cap 25 in this exemplary embodiment. Curve (2) represents the temperature of the heat-processed object support member 22 measured with side temperature measuring means 24.

"A" represents states in which an area under measurement is maintained at a high temperature of 2000 degrees for six minutes. As can be seen from FIG. 6, stable control can be achieved at a high-temperature of 2000 degrees. While the exemplary embodiment has been described with respect to an implementation in which the substrate 26 placed on the heat-processed object support member 22 is covered with the cap 25, an implementation of the heating process apparatus 20 illustrated in FIGS. 2 and 5 in which the substrate 26 is placed on the heat-processed object support member 22 without the cap is also possible.

Figure 7:
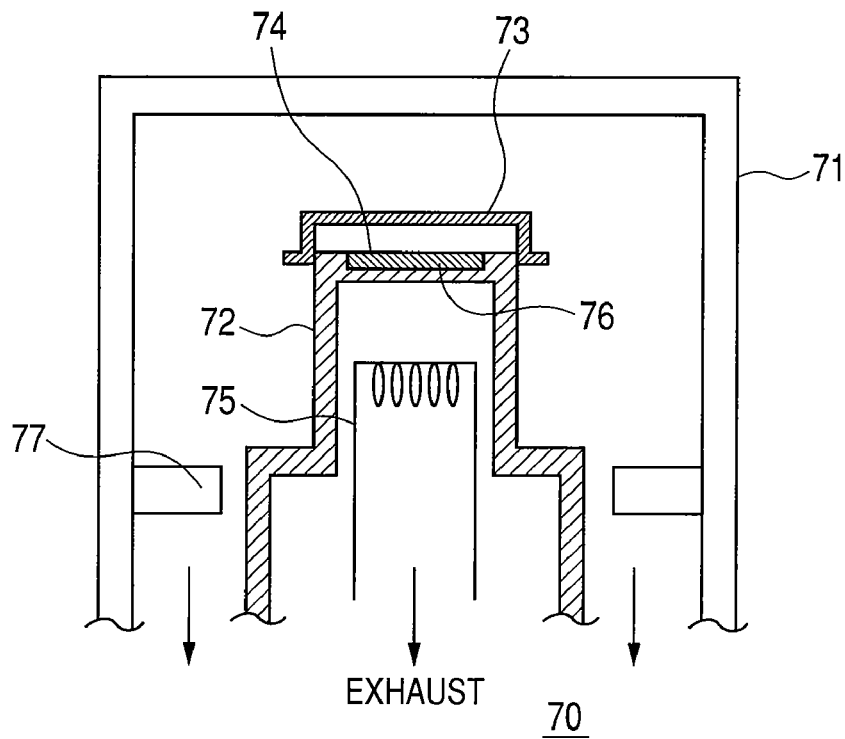
FIG. 7 is a schematic diagram of a substrate heating process apparatus according to the present invention.
Figure 8:
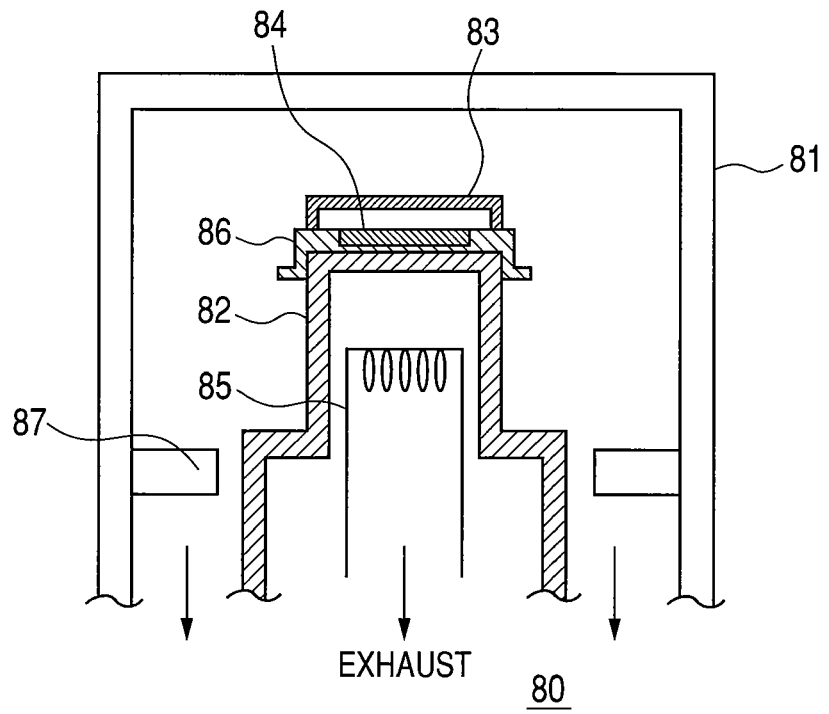
FIG. 8 is a schematic diagram of a substrate heating process apparatus according to the present invention.
Figure 9:
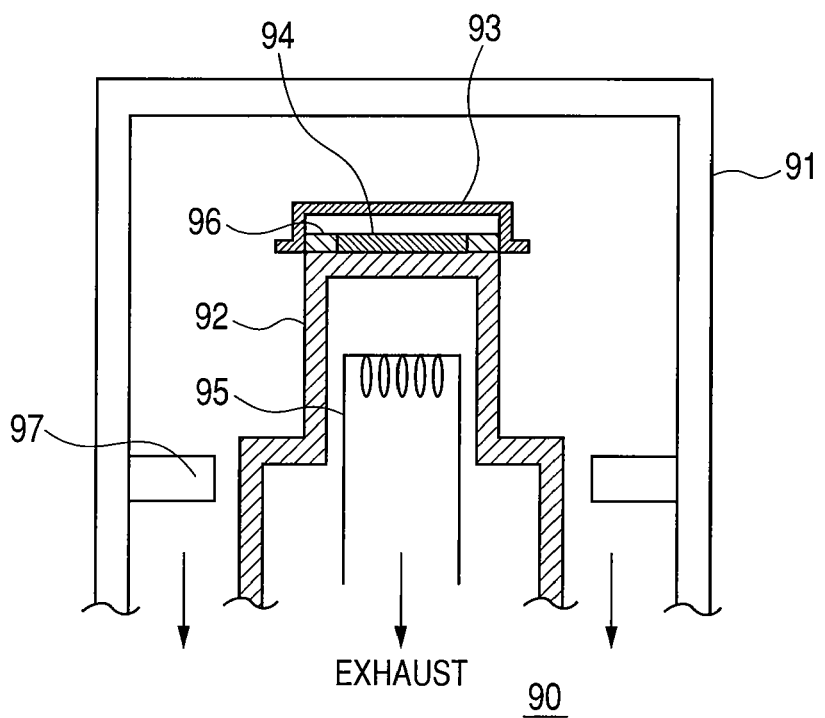
FIG. 9 is a schematic diagram of a substrate heating process apparatus according to the present invention.

A second embodiment of the present invention will be described next with reference to FIGS. 7 to 11. Shown in FIG. 7 are a heat-processed object support member 72 provided in a heating process chamber 71, a cap put on the heat-processed object support member 72, and a substrate 74 placed in a resting area 76 provided at the top of the heat-processed object support member 72. A heater 75 capable of heating the top of the heat-processed object support member 72 is provided in the heat-processed object support member 72. An intermediate flange 77 is provided in the heating process chamber 71. Structures shown in FIGS. 8 and 9 are the same as that in FIG. 7 except that a substrate transfer tray 86 or an enclosure plate 96 is provided at the top of the heat-processed object support member 82, 92. The substrate transfer tray 86 is provided in FIG. 8 in place of the resting area 76 provided at the top of the heat-processed object support member 72 shown in FIG. 7; an enclosure plate 96 is provided in FIG. 9 in place of the resting area 76 provided at the top of the heat-processed object support member 72 shown in FIG. 7. The same components as those in the first embodiment (the temperature measuring means, controller, and burn injury preventing means) will be omitted from the description and the figures.

In the heating process apparatuses 70 and 80 shown in FIGS. 7 and 8, substrates 74 and 84 to be processed are fitted in the resting area 76 provided at the top of the heat-processed object support member 72 and the substrate transfer tray 86, respectively. In the heating process apparatus 90 shown in FIG. 9, the enclosure plate 96 made of graphite (or SiC) with a thickness equivalent to that of the substrate 94 surrounding a substrate 94 is provided on the heat-processed object support member 92 and the substrate 94 is fitted inside the enclosure plate 96. The top surface of the enclosure plate 96 is mirror-finished whereas the back surface is preferably given a finishing that effectively improves the heat absorption efficiency.

Figure 10:
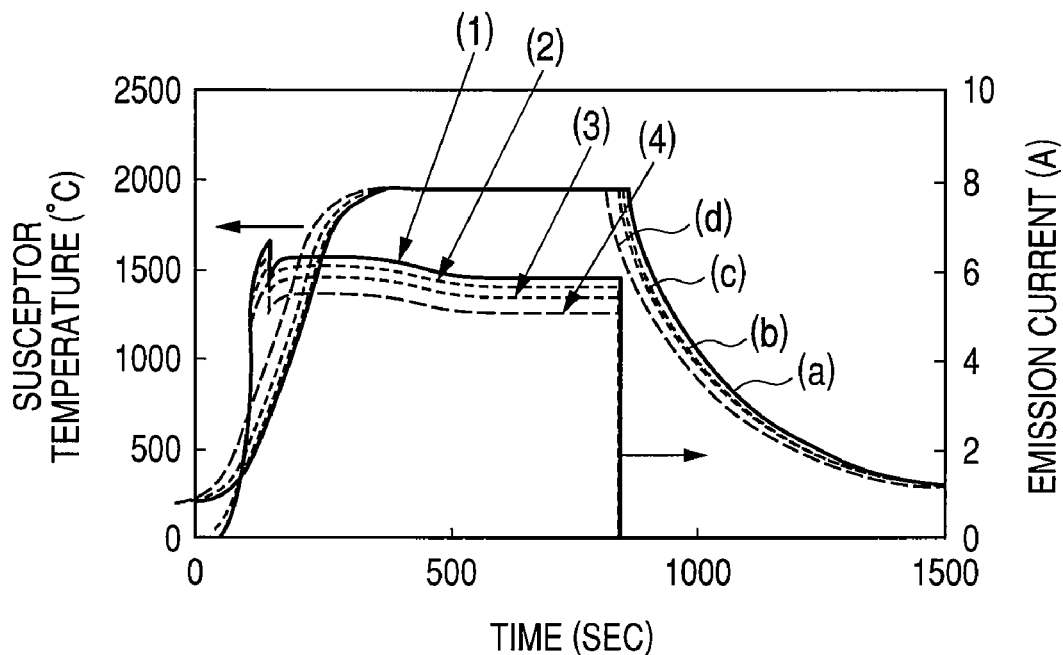
FIG. 10 is a diagram illustrating heating characteristics of a heat-processed object support member according to a conventional art.

Heating characteristics of the heat-processed object support members of the conventional system shown in FIG. 1 and the systems proposed by the present invention were examined. FIG. 10 shows the heating characteristics of the heat-processed object support member according to the conventional system.

Figure 11:
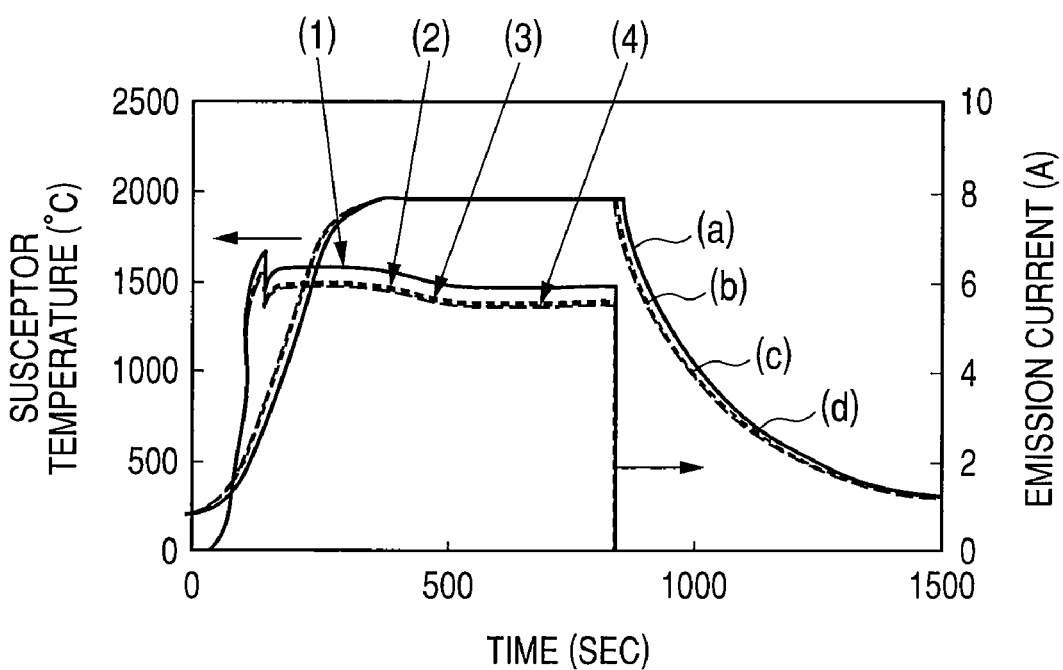
FIG. 11 is a diagram illustrating heating characteristics of a heat-processed object support member according to the present invention.

FIG. 11 shows the heating characteristics of the heat-processed object support members according to the system proposed by the present invention. Curves (1) to (4) shown in FIGS. 10 and 11 represent changes in the temperature (° C.) of the heat-processed object support members with time (seconds). Curve (1) represents the heating characteristic of the heat-processed object support member without a substrate heated at a set temperature of 2000 degrees for a retention duration of six minutes. Curve (2) represents the heating characteristic of the heat-processed object support member heated at a set temperature of 2000 degrees for a retention duration of six minutes with a 1-inch SiC substrate being placed thereon. Curve (3) represents the heating characteristic of the heat-processed object support member heated at a set temperature of 2000 degrees for a retention duration of six minutes with a 2-inch SiC substrate being placed thereon. Curve (4) represents the heating characteristic of the heat-processed object support member heated at a set temperature of 2000 degrees for a retention duration of six minutes with a 4-inch SiC substrate being placed thereon.

Curves (a) to (d) in FIGS. 10 and 11 represent changes in emission current (A) with time (seconds). Curve (a) represents changes in emission current without a substrate. Curve (b) represents changes in emission current with a 1-inch SiC substrate being placed. Curve (c) represents changes in emission current with the 2-inch SiC substrate being placed. Curve (d) represents changes in emission current with the 4-inch SiC substrate being placed.

As can be seen from FIGS. 10 and 11, in the conventional system, the emission current value and therefore the heat capacity of the tray varied depending on the different substrates placed and the start of temperature rise also varied. On the other hand, in the system proposed by the present invention, the emission current value was approximately constant, the heat capacity of the tray did not change, and the start of temperature rise showed a constant value independently of substrate sizes when the different substrates were placed. Therefore, the effectiveness of the present invention has been proven.

What is claimed:
1. A heating process apparatus comprising:
a process chamber;
a heat-processed object support member provided in the process chamber for heating a substrate disposed thereon;
a cap for covering the substrate disposed on the heat-processed object support member;
a heater for heating the heat-processed object support member;
temperature measuring means for measuring the temperature of the heat-processed object support member; and
control means, responsive to the temperature measured by the temperature measuring means, for controlling the heater, wherein
the temperature measuring means comprises a first temperature measuring unit and second temperature measuring unit which are respectively provided outside infrared ray energy-transmissive windows at an upper part and a side part of a peripheral wall of the process chamber,
each of the first and second temperature measuring units comprises a collector collecting infrared energy radiated from the heat-processed object support member and a calculating unit calculating temperature based on the ratio between the intensities of two wavelengths in the infrared ray,
the first measuring unit provided at the upper part of the peripheral wall of the process chamber measures a temperature of the cap, and the control means, in response to the temperature of the cap measured by the first measuring unit, controls the heater so as to set the cap temperature to a predetermined temperature, and
the second measuring unit, provided at the side part of the peripheral wall of the process chamber, measures a temperature of the heat-processed object support member, and the control means, in response to the temperature of the heat-processed object support member measured by the second measuring unit, turns off the heater when the temperature of the heat-processed object support member exceeds an over-heat critical temperature.

2. The heating process apparatus according to claim 1, wherein the cap comprises carbon, and the temperature measuring means is a radiation thermometer or a pyrometer capable of measuring temperatures in the range from 800 to 2300 degrees.

3. The heating process apparatus according to claim 1, wherein the heater includes a filament and a filament power supply, and
thermoelectrons generated at the filament are accelerated to bombard the heat-processed object support member to cause the heat-processed object support member to be heated.

4. The heating process apparatus according to claim 3, wherein
the temperature measuring means is connected to the controller; and
the controller controls the temperature of the heat-processed object support member to a temperature in the range from 800 to 2300 degrees and, when the temperature of the heat-processed object support member becomes equal to or higher than a set temperature, turns off the filament power supply.

5. The heating process apparatus according to claim 4, wherein
the controller comprises:
a thermostatic controller in which a measured temperature value of the heat-processed object support member is input from the temperature measuring means;
a sequencer comparing the measured temperature value input from the thermostatic controller with the set temperature value to control the value of electric power provided to the filament power supply; and
a graphic operation terminal connected to the sequencer and displaying the temperature of the filament.

6. The heating process apparatus according to claim 1, wherein
the temperature measuring means is connected to a controller;
the controller comprises:
a thermostatic controller in which a measured temperature signal is input from the temperature measuring means;
a sequencer controlling the heater on the basis of an input from the thermostatic controller; and
a graphic operation terminal connected to the sequencer; and in that
the sequencer turns off the heater and causes the graphic operation terminal to display an error indication when the measured temperature value input does not reach a specified temperature value input does not reach a specified temperature after a lapse of a predetermined time.

7. The heating process apparatus according to claim 1, wherein
the temperature measuring means is connected to a controller;
the controller comprises:
a thermostatic controller in which a measured temperature signal is input from the temperature measuring means;
a sequencer controlling the heater on the basis of an input from the thermostatic controller; and
a graphic operation terminal connected to the sequencer; and in that
the sequencer turns off the heater and causes the graphic operation terminal to display an error indication when a measured temperature value input from the thermostatic controller is not detected.

8. The heating process apparatus according to claim 1, wherein
the temperature measuring means is connected to a controller;
the controller comprises:
a thermostatic controller in which a measured temperature signal is input from the temperature measuring means;
a sequencer controlling the heater on the basis of an input from the thermostatic controller; and
a graphic operation terminal connected to the sequencer; and in that
the sequencer turns off the heater and causes the graphic operation terminal to display an error indication when the measured temperature signal from the temperature measuring means reaches a specified temperature value and is maintained at the specified temperature value for a period of time exceeding a specified period of time.

9. The heating process apparatus according to claim 1, wherein
the temperature measuring means provided on the side surface of the process chamber is connected to burn injury preventing means; and in that
the burn injury preventing means comprises:
a detector detecting whether a burn injury hazard is present or not; and
input means for inputting a signal to vent means connected to the process chamber on the basis of the result of the detector.

10. The heating process apparatus according to claim 9, wherein the temperature measuring means is a radiation thermometer capable of measuring temperatures in the range from 0 to 500 degrees.

11. The heating process apparatus according to claim 10, wherein the burn injury preventing means comprises:
a sequencer comparing a measured temperature value input from the temperature measuring means with a set temperature value and inputting a signal into vent means connected to the process chamber on the basis of the result of the comparison; and
a graphic operation terminal connected to the sequencer and displaying the measured temperature value.

12. The heating process apparatus according to claim 1, wherein the heating process apparatus further comprises a heat element covering a substrate placed on the heat-processed object support member; and in that
the heat receiving element has a transmissive hole through which energy radiated from the heat-processed object support member can be transmitted.

13. The heating process apparatus according to claim 1, wherein the heat-processed object support member has a resting area in which a substrate can be placed.

14. The heating process apparatus according to claim 1, wherein the heating process apparatus further comprises an enclosure surrounding a substrate placed on the heat-processed object support member.

* * * * *